United States Patent [19]

Evans et al.

[11] Patent Number: 4,458,402
[45] Date of Patent: Jul. 10, 1984

[54] ADJUSTABLE CRIMPING DIE FOR CLIPPER MECHANISM

[75] Inventors: Alfred J. Evans, Raleigh; Grover W. Blakeley, Apex, both of N.C.

[73] Assignee: Tipper Tie, Inc., Apex, N.C.

[21] Appl. No.: 455,468

[22] Filed: Jan. 3, 1983

[51] Int. Cl.³ ............................................. B23P 11/00
[52] U.S. Cl. .................................. 29/243.56; 72/482
[58] Field of Search ............... 29/243.56; 72/413, 482; 227/61, 62, 155; 53/138 A

[56] References Cited

U.S. PATENT DOCUMENTS

| Re. 30,196 | 1/1980 | Velarde | 29/243.56 |
| 3,636,611 | 1/1972 | Rosenbaum | 53/138 A |
| 4,001,926 | 1/1977 | Velarde | 29/243.56 |
| 4,004,339 | 1/1977 | Velarde | 29/243.56 |

FOREIGN PATENT DOCUMENTS

| 1053611 | 1/1967 | United Kingdom | 29/243.56 |
| 179595 | 4/1963 | U.S.S.R. | 72/482 |

Primary Examiner—James L. Jones, Jr.
Attorney, Agent, or Firm—Allegretti, Newitt, Witcoff & McAndrews, Ltd.

[57] ABSTRACT

An adjustable crimping die for use in combination with a clipper apparatus includes a wedge adjustment block adjustable in response to an adjustment screw to thereby position the die member with respect to the cooperative punch and control the tightness of a U-shaped clip about gathered material.

4 Claims, 1 Drawing Figure

ADJUSTABLE CRIMPING DIE FOR CLIPPER MECHANISM

BACKGROUND OF THE INVENTION

This invention relates to an improved clipper for attachment of U-shaped clips about gathered material and more particularly to the crimping die associated with such a clipper.

Metal U-shaped clips of the type including a crown and depending legs are often used to close or seal packages by being formed about gathered package material such as plastic netting or plastic wrapping material. The apparatus for attaching such clips about gathered material includes a punch which is driven in a channel against the crown of a clip in the channel. The clip thus moves down the channel into engagement with a die that forms the legs of the clip about the gathered material. Typical of prior art patents illustrating such a mechanism is U.S. Pat. No. Re. 30,196 for a "Single Piston Operated Clip Device" in the name of Velarde reissued Jan. 22, 1980, which patent is incorporated herewith by reference. Another device which applies to clips about a single portion of gathered material is depicted in U.S. Pat. No. 4,001,926 issued Jan. 8, 1977 entitled "Double Clipper, Single Piston Operated Device" in the name of Velarde.

It is often desirable to apply two clips, side by side and simultaneously, to a single portion of gathered material. In the past, when two clips are applied simultaneously, a problem has been encountered because the material being clipped may have non-uniform or unequal cross sections. For example, one of the two clips may also encircle a fastening strap.

Because the adjacent portions of gathered material may have unequal cross sections, one clip will be more loose than the other clip. This occurs even though the length and stroke of the punch and position of the die with respect to both clips is identical. In order to compensate for this discrepancy, punches of various lengths have been installed to act on adjacent clips. This requires manufacture of punches of various lengths and appropriate installation of the punches in the clipper apparatus. For this reason, the cross section of the gathered material differs for the adjacent clips.

As an alternative to use of punches of various lengths, adjacent shims have been inserted beneath the adjacent dies. The shims are small plates inserted under a die to adjust the die to the correct position for the clipping operation. This usually requires assembly and disassembly of the clipper in order to locate the shim. This is very time consuming and costly and may not produce the required adjustment except after many trial and error efforts.

The present invention contemplates a construction which overcomes the problems noted with respect to closing a clip with a cooperative punch and die.

SUMMARY OF THE INVENTION

Briefly, the present invention comprises the improvement in a clipper apparatus of a die adjustment mechanism retained in a counterbore for the die opposite the path of travel of the punch. In this manner the die is appropriately aligned and positioned for cooperation with the punch. The die is adjusted by means of a wedge member which engages the bottom surface of the die and translates the die to an appropriate position relative to the punch. Thus, it is an object of the present invention to provide an improved clipper apparatus which includes an adjustable die cooperative with a punch for forming a U-shaped clip about gathered material.

Still a further object of the present invention is to provide an economical construction for an adjustable die used in cooperation with a punch for forming a U-shaped clip about gathered material.

One further object of the present invention is to provide a mechanically reliable and easily adjusted die construction cooperative with a punch.

These and other objects, advantages and features of the invention will be set forth in the detailed description which follows.

BRIEF DESCRIPTION OF THE DRAWING

In the detailed description which follows, reference will be made to the drawing comprised of the following figures:

The single FIGURE comprises a sectional view of an improved clipper incorporating the adjustable die mechanism of the present invention.

DESCRIPTION OF THE PREFERRED EMBODIMENT

Figure 1:
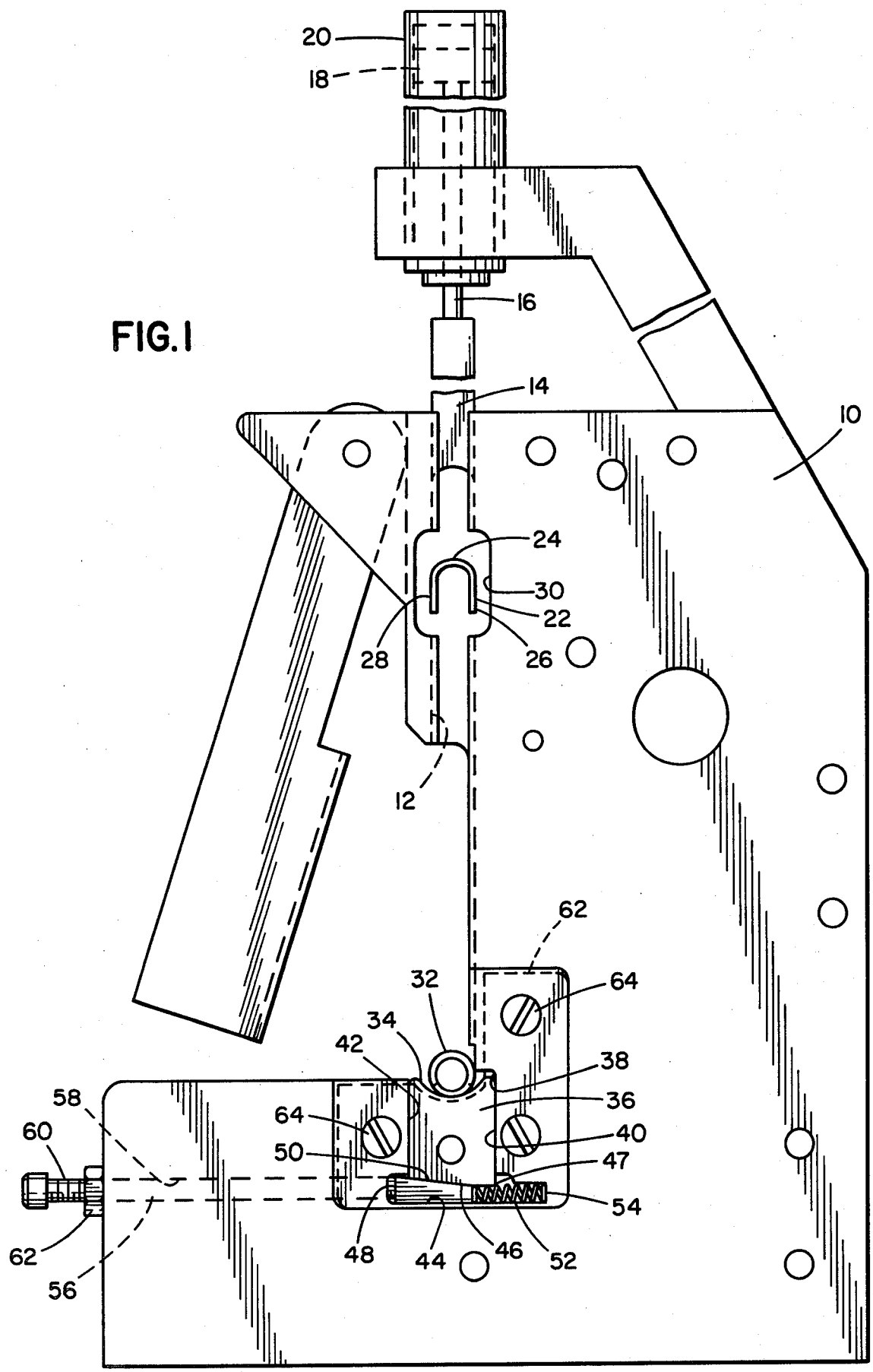

As shown in the drawing, a typical clipper of the type which may incorporate the subject matter of the present invention includes a C-shaped mounting plate 10 which includes a channel 12 for receipt of a reciprocating punch 14. Typically the punch 14 is driven by a depending drive rod 16 associated with a piston 18 incorporated in a cylinder 20 mounted on the plate 10. Thus, the punch 14 will be reciprocated in response to operation of the piston 18.

The punch 14 is fashioned to engage a U-shaped clip 22 having a crown 24 and depending legs 26 and 28. The clip 22 fits into the channel 12 through a channel opening or feed 30, is engaged by the punch 14 and driven downwardly through the channel 12. Gathered material 32 which is inserted through the throat defined by the plate 10 is positioned so that legs 26, 28 will fit on each side of the gathered material 32. As the punch descends, it causes the legs 26, 28 to engage with a spiral groove 34 formed in the active surface of die 36 and thus form about the gathered material 32.

The structure so far described is typical of a clipper apparatus which is utilized to form U-shaped clips about gathered material. Also typically, more than one clip may be formed about the gathered material by arranging the punches and dies in a side by side array wherein the punches are generally driven by a single piston.

The present invention relates to the combination of an improved die construction as incorporated with a typical clipper apparatus. Specifically, the die 36 is retained in an elongated counterbore 38 so that the die 36 may move vertically upward and downward within the counterbore 38 toward and away from the line of travel of the punch 14. Thus, the die 36 slides between side walls 40, 42 defining the counterbore and is retained elevated from a bottom surface 44 of the counterbore 38. The die 36 includes a lower surface 46 which is inclined slightly with respect to the transverse direction of the path of travel of the punch 14. Lower surface 46 of die 36 is canted or inclined approximately three to fifteen degrees from the horizontal as depicted in the drawing.

The lower section of the counterbore 38 is milled beyond the limits of the sidewalls 40, 42 to define a slide passage 47. In this manner a wedge member 48 may be slidably inserted within the slide passage 47 of the counterbore 48. Wedge member 48 is wedge shaped and includes an inclined surface 50 cooperative with surface 46 of die 36. The wedge member 48 moves transversely with respect to the direction of movement of punch 14 and by sliding on surface 44 causes the die 36 to move upward or downward. A return spring 52 is positioned in a guide slot 54 against the back side of wedge member 48. Spring 52 thus tends to drive the wedge member 48 in a direction which will lower the die 36 in the counterbore 38.

In opposed relation to the force of the spring 52 is a push rod 56 which is slidably mounted in a passage 58 in plate 10. The push rod 56 moves in response to an adjustable screw 60 which is threadably inserted into the bore or passage 58 which receives the rod 56. A locknut 62 retains the adjustable screw 60 in a desired fixed position. By adjusting the position of the screw 60 against the rod 56, it is possible to push the wedge member 48 against the force of the spring 52. This, in turn, positions the die 36 in a precise and careful manner in counterbore 38.

The die 36 and other parts in counterbore 38 are retained in position by a cover plate 62 (shown in phantom). The cover plate 62 is retained by screws 64 which fasten cover plate 62 to the plate 10.

Assuming the length of the punch 14 is fixed and the distance of travel of the punch 14 is also fixed, it is possible to adjust the position of the die 36 by movement of the push rod 56. In this manner the tightness of a U-shaped clip 22 formed about gathered material 32 can be adjusted. Thus, if a series of dies and punches are arrayed side by side for formation about gathered material, it is possible to carefully adjust the die position and therefore the tightness of the clip about the gathered material to the best advantage of the packaging apparatus.

While there has been set forth a preferred embodiment of the invention, it is to be understood that the invention is to be limited only by the following claims and their equivalents.

What is claimed is:

1. In a clip attachment apparatus of the type for attaching a U-shaped clip, having a crown and depending legs, about gathered material by forming the legs of the U-shaped clip to encircle the gathered material, said apparatus including a C-shaped die support plate with a channel for receipt of a clip and a die support for holding a die that directs the deformation of the legs of the clip, a punch slidable in the channel for engaging the crown of a clip to drive the clip against the die, and means for operating the punch to reciprocate in the channel, the improvement comprising, in combination:

an adjustable crimping die mounted in the die support, said adjustable crimping die including a die block having a curved die forming spiral groove for receipt of the legs of a clip, said block being slidably positioned in a counterbore in the die support plate to move toward and away from the direction of clip movement in the channel, said block including a lower wedge surface;

a wedge member supported on a base surface of the counterbore and slidable transversely in the direction of punch travel in the counterbore against the lower wedge surface of the die block to engage the surface and move the die block relative to the extent of travel of the punch thereby controlling the formation of the clip about the gathered material; and an adjustable wedge member drive rod means in the die support plate engaged against the wedge member to control the position of the wedge member and thus the position of the die block.

2. The improvement of claim 1 including a threaded adjusting screw mounted for engagement against the drive rod means to translate the drive rod in a direction against the wedge member.

3. The improved apparatus of claim 1 including a biasing spring in the counterbore engaged against the wedge member to maintain the wedge member tightly against the wedge member drive rod means.

4. The improved apparatus of claim 1 in combination with at least one more die and punch arranged in parallel array for attaching a second U-shaped clip about the gathered material adjacent the first U-shaped clip.

* * * * *